G. E. STINSON.
CONDUCTING PIPE.
APPLICATION FILED OCT. 2, 1912.
1,061,418.
Patented May 13, 1913.
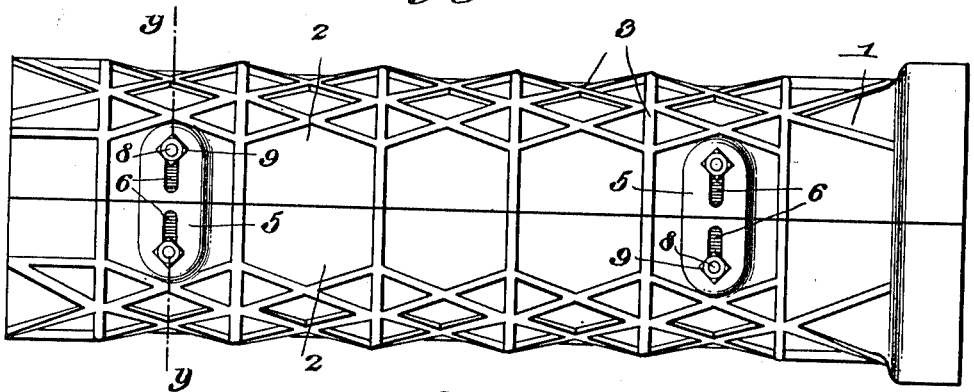
Fig. 1.
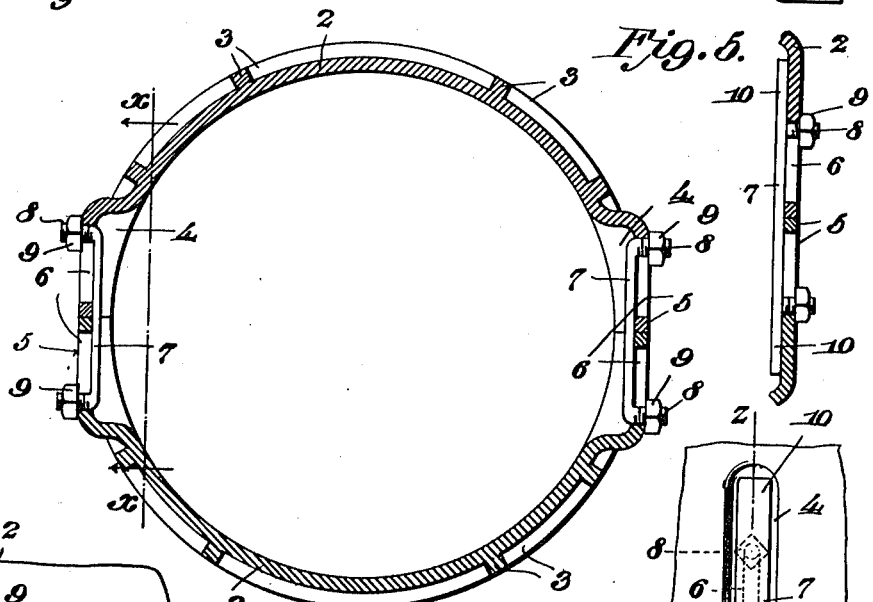
Fig. 2.
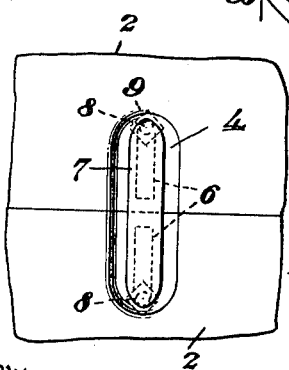
Fig. 3.
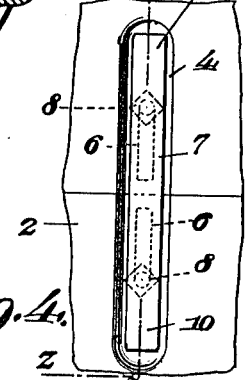
Fig. 4.
Fig. 5.
Witnesses:
Inventor
George E. Stinson.
By Joshua R. H. Potts
Attorney

UNITED STATES PATENT OFFICE.

GEORGE EDSON STINSON, OF CLEVELAND, OHIO.

CONDUCTING-PIPE.

1,061,418.  Specification of Letters Patent.  Patented May 13, 1913.

Application filed October 2, 1912. Serial No. 723,462.

*To all whom it may concern:*

Be it known that I, GEORGE E. STINSON, a citizen of the United States, residing at Cleveland, county of Cuyahoga, and State of Ohio, have invented certain new and useful Improvements in Conducting-Pipes, of which the following is a specification.

My invention relates to pipes and particularly to metal culvert pipes.

The object of my invention is to provide a pipe of improved construction which shall be free to expand and contract to prevent breaking of the same particularly during freezing weather.

In carrying out my invention I form each section of pipe of two similar longitudinal parts and connect the same by suitable means which will permit expansion particularly when the contents of the pipe freeze.

A further object of my invention is to provide a pipe as mentioned in which the means used for connecting the parts shall not interfere with or obstruct the passageway through the pipe.

Other objects will appear hereinafter.

My invention will be more readily understood by reference to the accompanying drawings forming a part of this specification and in which—

Figure 1 is a side elevation of a section of pipe embodying my invention in its preferred form. Fig. 2 is a transverse section on the line *y—y* of Fig. 1 and illustrated upon an enlarged scale. Fig. 3 is a detail view illustrating in elevation one of the connecting devices, the same being taken on substantially the line *x—x* of Fig. 2. Fig. 4 is a similar view of a slightly modified form and Fig. 5 is a section on the line *z—z* of Fig. 4.

Referring now to the drawings 1 indicates a section of pipe, preferably of cast iron. This is formed of two similar longitudinal parts 2—2, each part being substantially semicylindrical and provided with strengthening or reinforcing ribs 3.

The parts 2 are provided at their edges with two or more registering offset pockets 4 the outer walls 5 of which are preferably straight and in alinement and are formed with slots 6. Arranged within the pockets 4, and covering the slots 6 are elongated plates 7 provided adjacent their ends with threaded studs 8. The studs 8 project through the slots 6 and are provided with nuts 9 impinging against the outer faces of walls 5.

It is obvious that with the construction above described, should the contents of the pipe freeze, the pipe will readily expand, and by arranging the fastening devices within the offset portions or pockets 4, the bore or passageway through the pipe is unobstructed.

In Figs. 1 to 3 inclusive I have illustrated a form of the device wherein the studs 8 are arranged at the ends of the plates 7, but if preferred the plates may be extended beyond the studs 8 as indicated at 10 in Figs. 4 and 5, so that, irrespective of the amount of expansion of the pipe, the slots will remain closed by the plates 7.

Having described my invention what I claim as new and desire to secure by Letters Patent is:

1. A pipe formed of two similar longitudinal parts having abutting edges, said parts being provided adjacent their edges with spaced alined slots, plates covering said slots and securing means on said plates extending through said slots, substantially as described.

2. A pipe formed of similar longitudinal parts, said parts being provided with transversely alined slots, covering means for said slots and integral securing means on said covering means extending through said slots, substantially as described.

3. A pipe formed of similar longitudinal sections, the adjacent edges of said sections being formed with registering recesses, the walls of said recesses being formed with alined slots; plates in said recesses covering said slots, integral studs on said plates projecting through said slots and nuts threaded on said studs, substantially as described.

In testimony whereof I have signed my name to this specification in the presence of two subscribing witnesses.

GEORGE EDSON STINSON.

Witnesses:
HAZEL BOYD STINSON,
WILLIAM F. TOLL.